United States Patent
Hu et al.

(10) Patent No.: US 11,279,837 B2
(45) Date of Patent: Mar. 22, 2022

(54) MULTICOLOR PAINT COMPOSITION

(71) Applicant: Dow Global Technologies LLC, Midland, MI (US)

(72) Inventors: Minbiao Hu, Shanghai (CN); Shiling Zhang, Shanghai (CN); Wei Li, Shanghai (CN); Dong Yun, Shanghai (CN); Huan Chen, Shanghai (CN); Yasmin N. Srivastava, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 293 days.

(21) Appl. No.: 16/472,070

(22) PCT Filed: Dec. 20, 2016

(86) PCT No.: PCT/CN2016/111070
§ 371 (c)(1),
(2) Date: Jun. 20, 2019

(87) PCT Pub. No.: WO2018/112753
PCT Pub. Date: Jun. 28, 2018

(65) Prior Publication Data
US 2020/0095435 A1    Mar. 26, 2020

(30) Foreign Application Priority Data

Dec. 20, 2016  (WO) ................ PCT/CN2016/111070

(51) Int. Cl.
| | | |
|---|---|---|
| C09D 5/29 | (2006.01) | |
| C09D 7/61 | (2018.01) | |
| C09D 175/04 | (2006.01) | |
| C08K 3/34 | (2006.01) | |

(52) U.S. Cl.
CPC ................ C09D 5/29 (2013.01); C09D 7/61 (2018.01); C09D 175/04 (2013.01); C08K 3/346 (2013.01)

(58) Field of Classification Search
CPC .......... C09D 5/29; C09D 7/61; C09D 175/04; C08K 3/346
USPC ......................................................... 524/446
See application file for complete search history.

(56) References Cited

U.S. PATENT DOCUMENTS

| | | | |
|---|---|---|---|
| 3,950,283 | A | 4/1976 | Sellars et al. |
| 4,264,322 | A | 4/1981 | Lewis et al. |
| 4,812,492 | A | 3/1989 | Eckes et al. |
| 5,199,980 | A | 4/1993 | Lynch et al. |
| 5,314,535 | A | 5/1994 | Lynch et al. |
| 5,318,619 | A | 6/1994 | Lynch et al. |
| 5,437,719 | A | 8/1995 | Lynch et al. |
| 5,480,480 | A * | 1/1996 | Lynch ...................... C09D 5/29 106/181.1 |
| 5,943,764 | A * | 8/1999 | Blecha ................... H01C 17/08 29/623 |
| 6,005,031 | A | 12/1999 | Bremer-Masseus et al. |
| 9,519,079 | B2 | 12/2016 | Kaneko et al. |
| 2018/0346740 | A1 | 12/2018 | Andersen et al. |

FOREIGN PATENT DOCUMENTS

| | | |
|---|---|---|
| CN | 101230232 | 7/2008 |
| CN | 101400850 | 4/2009 |
| CN | 102391767 | 3/2012 |
| CN | 103756486 | 4/2014 |
| CN | 104372691 | 2/2015 |
| DE | 10146483 | 5/2003 |
| EP | 505664 | 9/1992 |
| EP | 1004638 | 11/2004 |
| GB | 2078243 | 1/1982 |
| JP | H09296106 | 11/1997 |
| JP | 2007231151 | 9/2007 |
| JP | 2007238919 | 9/2007 |
| JP | 2007296459 | 11/2007 |
| JP | 2007321045 | 12/2007 |
| JP | 2011201955 | 10/2011 |
| JP | 2011201955 A * | 10/2011 |
| WO | 00/36029 | 6/2000 |
| WO | 2014095164 | 6/2014 |

\* cited by examiner

Primary Examiner — Kelechi C Egwim
(74) Attorney, Agent, or Firm — Brooks, Cameron & Huebsch, PLLC (57) ABSTRACT

A composition comprising a colored synthetic gel useful for the preparation of waterborne multicolor paints.

10 Claims, 6 Drawing Sheets

FIG. 6d ically good water resistance. It also would be desirable to have a multicolor coating composition that could produce a coating with silky, flaky or silky-flaky patterns. In addition, it would be desirable to have a multicolor coating composition comprising a gel that could provide good colorant protection, and that would be compatible with a wide variety of binders to give more options to painters.

MULTICOLOR PAINT COMPOSITION

This application is a National Stage Application under 35 U.S.C. § 371 of International Application Number PCT/CN2016/111070, filed Dec. 20, 2016 and published as WO 2018/112753 on Jun. 28, 2018, the entire contents of which are incorporated herein by reference in its entirety.

BACKGROUND OF THE INVENTION

The invention relates to multicolor paints that can be employed to prepare coatings with granular, silky, flaky or silky-flaky patterns.

Waterborne multicolor paint (MCP) is a well-known type of decorative wall coating. After application, it can produce different decorative appearances on exterior or interior walls. The ornamental and durable surface coating makes multicolor wall paints an ideal solution for redecoration or new construction. Prior art multicolor paints utilized diversified technologies, such as metal ion based cross-linking, redispersing of colorant particles and organic protection gel, etc. Nevertheless, some inherent problems still restrain the growth of multicolor paint.

Prior art based on ionic interactions, where the cross-linker includes ions of calcium, aluminum, zinc and boron, have the potential to hurt the stability of acrylic polymer binders, resulting in the loss of final coating performance properties.

In many prior art multicolor paints, natural polysaccharides or derivatives thereof, such as cellulose and its derivatives, natural gums like guar gum, alginate, locust bean gum etc. are used as functional hydrocolloids. Dissolving these high molecular weight natural polymers takes a significant amount of time and usually requires heating. Hydrogels based on these natural polymers are biodegradable, which can lead to stability issues. In addition, in these paint systems, a composite gel is used to improve coating properties and performance. Mixing different gels and cross-linkers can also cause production issues.

Most of the currently available MCP commercial products are applied by spraying. They cannot be applied by brush or trowel due to the following reasons: a) the colored granules tend to be broken by shearing force; b) the hard, gelatinous or brittle globules give low surface drag and tend to skid on smooth surfaces; and c) inadequate separation between the dispersed phase and the continuous phase aggravates the tendency to skid. While application by spray-gun is widely used, the requirement of such a special application instrument has limited the use of prior art MCPs in many applications, especially in the interior wall and do-it-yourself markets.

In addition, due to some limitations of the material systems used in MCP, the water resistance of the paint typically is poor; therefore, multilayer coating is necessary to solve this problem, including the use of a prime coat, middle coat and top coat. This complicated application is time consuming, labor intensive and relatively high cost.

Most prior art multicolor paints have similar decorative performance. Unique effects such as silky, flaky or silky-flaky patterns are difficult to achieve with the prior art paints, especially in some high-end art paints. For example, in MCP based on natural gel, the appearance is usually granular.

In view of the deficiencies of the prior art, it would be desirable to have MCP products that would be suitable for a simple application process, e.g., that could be applied without a spray gun. It would also be desirable to have an MCP that could be used to prepare coatings with improved water resistance. It also would be desirable to have a multicolor coating composition that could produce a coating with silky, flaky or silky-flaky patterns. In addition, it would be desirable to have a multicolor coating composition comprising a gel that could provide good colorant protection, and that would be compatible with a wide variety of binders to give more options to painters.

SUMMARY OF THE INVENTION

In one aspect, the composition of the invention is such a multicolor coating composition comprising a colored hydrophilic polyurethane prepolymer gel, and a binder phase, wherein the gel is prepared from the reaction, in the presence of a colorant, of water and a prepolymer having a free NCO content of from 1 to 5 wt. %, based on the weight of the prepolymer, and wherein zero or more of the following optional components may be included: a clay, a peptizing agent, an extender, a dispersant, a biocide, a defoamer and/or a rheology modifier.

In another aspect, the invention includes a composition comprising a colored hydrophilic polyurethane prepolymer gel.

Surprisingly, the composition of the invention is capable of producing coatings having silky, flaky or silky-flaky patterns, or patterns that can resemble natural granite. The composition of the invention may be employed to prepare MCP that is easy to apply, and that has surprisingly good water resistance.

BRIEF DESCRIPTION OF THE DRAWINGS

FIG. 6 shows the appearance of coatings before and after using a trowel.

DETAILED DESCRIPTION OF THE INVENTION

In one aspect, the composition of the invention comprises a colored hydrophilic polyurethane prepolymer gel, or hydrogel. The invention also includes a composition comprising the colored gel and a binder phase, wherein the binder phase comprises a binder and zero or more of the following optional components: a clay, a peptizing agent, a defoamer and/or a rheology modifier.

As used herein, the terms "a," "an," "the," "at least one," and "one or more" are used interchangeably. The terms "comprises" and "includes" and variations thereof do not have a limiting meaning where these terms appear in the description and claims. Thus, for example, a composition that includes "a" material can be interpreted to mean that the composition includes "one or more" materials.

As used herein, the term "wt. %" refers to weight percent.

As used herein, the term "binder phase" refers to a phase in which the gels are dispersed. The binder phase may, however, contain other solids such as, for example, inorganic particulates.

As used herein, the term "prepolymer content of the gel" means the amount of prepolymer in reacted form that is in the gel.

In one embodiment of the invention, the weight ratio of the gel to the binder phase is from 1:20 to 10:1

The gel is a hydrophilic polyurethane prepolymer gel, which is also referred to herein as a hydrogel. It can be formed by the reaction of water and a hydrophilic modified polyurethane (PU) prepolymer. The reaction proceeds readily at room temperature and atmospheric pressure. In one embodiment of the invention, the colored gel is formed by admixing under conditions sufficient to form a gel from 0.5 to 15 wt. % hydrophilic polyurethane prepolymer, from 0.05 to 10 wt. % colorant, from 0 to 20 wt. % of an optional second cross-linker, and water to bring the total to 100 wt. %. Water acts as the first cross-linker, but not all of the water reacts with the prepolymer. In various embodiments, the upper limit on the amount of prepolymer used in forming the gel is less than 3 wt. %, not more than 5 wt. %, or not more than 10 wt. %, or not more than 15 wt. %. In various embodiments, the lower limit on the amount of prepolymer used in forming the gel is at least 0.5 wt. %, at least 1 wt. %, or at least 3 wt. %. Thus, in various embodiments, the prepolymer content of the gel is: from 0.5 wt. % to less than 3 wt. %, not more than 5 wt. % not more than 10 wt. %, or not more than 15 wt. %; from 1 wt. % to less than 3 wt. %, not more than 5 wt. % not more than 10 wt. % or not more than 15 wt. %; or from 3 wt. % to not more than 5 wt. % not more than 10 wt. % or not more than 15 wt. %. Mixtures of gels can be employed.

The colored hydrophilic polyurethane prepolymer gel advantageously is formed by reacting water with a hydrophilic polyurethane prepolymer in the presence of a colorant. In one embodiment of the invention, the prepolymer is a NCO-terminated hydrophilic prepolymer, e.g. a NCO-terminated hydrophilic MDI prepolymer. Advantageously, the prepolymer is contacted with a stoichiometric excess of water to form the hydrogel. The amount of prepolymer affects the properties of the gel. Higher amounts of prepolymer tend to lead to a more viscous, or stronger (tougher), gel, while lower amounts of prepolymer tend to lead to a less viscous, or weaker, gel, all else being equal. The desired amount of prepolymer to employ can be determined by routine experimentation using the guidance given herein. Similarly, the amount of the optional second cross-linker will affect the properties of the gel. The texture and strength of the gel can be adjusted or tuned by cross-linking chemistry. For example, use of a second cross-linker will improve the strength of a gel, generally speaking. The preparation of certain hydrophilic polyurethane prepolymer gels is described in, e.g., U.S. 2006/01425829.

For the purposes of the invention, the term "weak gel" means a gel that extends to thread-like or plate-like gels after shearing or gel break up. In one embodiment of the invention, a weak gel is a gel that has less than a 3 wt. % prepolymer content of the gel.

For the purposes of the invention, the term "strong gel" means a gel that possesses 3-dimensional (3D) gel granules after the initial gel is broken-up. A "strong gel" is more granular and does not extend to thread-like or plate-like gels after shearing or gel break up. In one embodiment of the invention, a strong gel has at least a 3 wt. % prepolymer content of the gel.

In one embodiment of the invention, the hydrophilic polyurethane prepolymer advantageously is formed by the reaction of an isocyanate and a polyol. In one embodiment of the invention, the prepolymer advantageously is formed by the reaction of an isocyanate and a polyol optionally with an additional amine. In one embodiment of the invention, the prepolymer is an isocyanate-terminated prepolymer, and is the reaction product of (a) a polyether polyol composition having a nominal hydroxyl functionality of from 1.6 to 8, a number average molecular weight of from 1,000 to 12,000, and at least 30 wt. % of oxyethylene groups, and (b) an isocyanate composition that contains methylene diphenylisocyanate (MDI) in at least about 60 wt. % of the total isocyanate present and wherein MDI comprises the 2,4'- and 4,4'-methylene diphenylisocyanate isomers in a molar ratio of from 25:75 to 80:20, such that the prepolymer has a free NCO content of from 1 to 5 wt. %, or from 1.5 to 3 wt. %, based on the weight of the prepolymer. Suitable polyols and isocyanates are commercially available or can be prepared using standard processes known to those skilled in the art. Examples of suitable isocyanates include MDI, toluene diisocyanate (TDI), isophorone diisocyanate (IPDI), and mixtures thereof. In one embodiment of the invention, a polyol and diisocyanate are admixed at from 20 to 100° C., optionally in the presence of a urethane-forming catalyst such as, for example, a tin compound or a tertiary amine, for a time sufficient to form the prepolymer. The ratio of the reactive functional groups of the polyol to the reactive functional groups of the isocyanate is sufficient to obtain the desired free NCO content, e.g. from 1 to 5 wt. %, in the prepolymer, and can be readily calculated by one skilled in the art in order to determine how much polyol and isocyanate to employ in the preparation of the prepolymer.

Conventional additives, such as additives known in the art for use in forming prepolymers and polyurethanes, may be used in the preparation of the prepolymer. For example, the composition for forming the prepolymer may include at least one catalyst, at least one cross-linker, and/or at least one chain extender. Further information on the preparation of the prepolymer may be found in U.S. 2006/0142529 and U.S. 2015/0087737.

The polyol advantageously is a polyoxypropylene-polyoxyethylene polyol having a number average molecular weight of from 3,000 g/mole to 9,000 g/mole and a polyoxyethylene content of at least 50 wt. %, based on a total weight of the polyoxyethylene-polyoxypropylene polyol). The polyoxypropylene-polyoxyethylene polyol may have a nominal hydroxyl functionality from 1.6 to 8 (e.g., 1.6 to 4.0). In one embodiment of the invention, the remainder of the weight content of the polyoxyethylene-polyoxypropylene polyol based on a total of 100 wt. % is accounted for with polyoxypropylene, e.g., the polyoxypropylene content is at least 5 wt. % in the polyol. For example, the polyoxyethylene content advantageously is from 55 wt. % to 85 wt. %, from 60 wt. % to 80 wt. %, from 65 wt. % to 80 wt. %, from 70 wt. % to 80 wt. %, and/or from 74 wt. % to 76 wt. %, with the remainder being polyoxypropylene.

The polyol may include at least one other polyether polyol. The at least one other polyether polyol may have an average nominal hydroxyl functionality from 1.6 to 8 (e.g., 1.6 to 4.0) and a number average molecular weight from 1000 to 12,000 (e.g., 1,000 to 8,000, 1,200 to 6,000, 2,000 to 5,500, etc.). Further, combinations of other polyether polyols, including monohydroxyl substances and low molecular weight diol and triol substances or amines, of varying functionality and polyoxyethylene content may be used in the composition for preparing the prepolymer.

The polyol may also include polyethylene glycol (also known as PEG and polyoxyethylene glycol). The polyethylene glycol may have a number average molecular weight from 500 g/mol to 2000 g/mol (e.g., from 500 g/mol to 1500 g/mol, from 750 g/mol to 1250 g/mol, from 900 g/mol to 1100 g/mol, etc.).

Advantageously, a prepolymer having a positive amount of less than 5 wt. %, or less than 3 wt. %, isocyanate groups is employed to prepare the hydrogel. In various embodiments of the invention, the prepolymer has from 1 to 3 wt. %, from 1 to 5 wt. %, from 1.5 to 5 wt. %, or from 1.5 to 3 wt. %, free isocyanate groups. Mixtures of prepolymers can be employed.

Various hydrophilic polyurethane prepolymers are known in the art. Useful prepolymers are available from The Dow Chemical Company under the HYPOL™ brand including, for example, HYPOL™ JT6005 brand prepolymer and HYPOL™ 2060GS brand prepolymer. HYPOL™ JT6005 brand prepolymer is a TDI-based polyurethane prepolymer having an NCO content of 3.1% as determined by ASTM D 5155 and a viscosity at 20° C. of 10,000 as determined by ASYM D 4889.

In one embodiment of the invention, the prepolymer can be reacted with an active-hydrogen-containing molecule, such as, for example, an amine, alcohol or water, to form the gel. In one embodiment of the invention, the prepolymer is reacted with only water, and not an amine or alcohol, in order to form the gel.

In one embodiment of the invention, a portion of the water is employed to react with the prepolymer to create the hydrogel, and no other cross-linker is employed in gel formation. The absence of other added cross-linkers for gel formation is advantageous in that there is no unreacted residual second cross-linker to pose the threat of flocculation to the latex or other binder employed in the composition of the invention. In one embodiment of the invention, the gel is free of other salts or additives, such as polysaccharides, such as natural gum, alginate or cellulose, thereby further lowering the risk of flocculation of the binder employed in binder phase.

The colorant can be organic or inorganic, preferably inorganic, and may be in particle form. Colorants, or pigments, are well known to those skilled in the art, and many are commercially available. Examples of the colorants include, but are not limited to, titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, organic yellow, and any combination thereof. Mixtures of colorants can be employed. The amount of colorant employed is an amount that is sufficient to impart the desired color to the MCP. In one embodiment of the invention, the gel comprises from 0.05 to 10 wt. %, or from 0.1 to 1 wt. % colorant, colorant based on the weight of the gel. The composition of the invention may include multiple colored gels such as, for example, more than one gel wherein each gel comprises a different colorant than another gel.

An extender optionally may be employed. For example, the colorant optionally may be mixed with an extender, and/or an extender may be employed in the binder phase. Thus, the extender may be in the gel or in the binder phase. As used herein, the term "extender" refers to a particulate inorganic material having a refractive index of less than or equal to 1.8 and greater than 1.3 and includes, for example, calcium carbonate, calcium sulfate, aluminosilicates, silicates, zeolites, mica, diatomaceous earth, solid or hollow glass, and ceramic beads. Mixtures of extenders can be employed.

In one embodiment of the invention, an optional, second cross-linker is employed when additional gel strength or toughness is desired. Cross-linkers are well known in the art. Examples of suitable cross-linkers include hydrophilic polyisocyanates, silanes, and polyamines. Mixtures of cross-linkers can be employed.

The strength or toughness of the hydrogel can be easily adjusted or tuned by the concentration of the prepolymer, the optional second cross-linker, the colorant, especially when the colorant is inorganic, and optional extenders. When the gel is weak, the colorant in the gel may not be well protected and clay from the binder phase may help to protect the colorant. Without wishing to be bound by any theory, it is possible that the clay may collect or assemble on the surface of the dispersed gel to inhibit the release of colorant from the gel. With a high concentration of the reacted prepolymer in the gel, e.g. more than 3 wt. %, the colorant can be well protected by the gel structure and it can give a granular pattern to an MCP; however, with low concentration of the reacted prepolymer in the gel, e.g. less than or equal to 3 wt. %), the colorant may not be well protected by the gel structure, and the clay can help to protect the colorant and it can give special silky or flaky patterns to an MCP prepared using the gel. MCPs prepared from the gel can have smooth, flat surfaces after drying, especially when the prepolymer content of the gel is relatively low.

The composition of the invention can be used to prepare coatings, such as MCP. A wide variety of coating formulations can be employed. In coating applications, the colored gel or gels are dispersed in the binder phase, which comprises a binder and optional additives. Additives that may be useful in coating or paint formulations include: a coalescing agent; a cosolvent; a surfactant; a buffer; a neutralizer; a rheology modifier, including a thickener; a dispersant; a humectant; a wetting agent; a biocide, including a mildewcide; a plasticizer; a pigment; an extender; a clay; a defoamer; an anti-skinning agent; a flowing agent and/or an antioxidant. However, as demonstrated in the examples that follow, MCPs can be prepared using relatively simple formulations.

The binder phase comprises at least one binder and can include various optional components. In one embodiment of the invention, the binder phase comprises from 1 to 70 wt. % of the binder, from 0 to 10 wt. % clay, from 0 to 1 wt. % peptizing agent, from 0 to 3 wt. % defoamer and from 0 to 3 wt. % rheology modifier, wherein the total weight of the binder phase is 100 wt. %. In one embodiment of the invention, the binder phase comprises from 1 to 70 wt. % binder, from 0.1 to 10 wt. % clay, from zero or 0.01 to 1 wt. % peptizing agent, from 0 to 3 wt. % defoamer and from 0 to 3 wt. % rheology modifier, wherein the total weight of the binder phase is 100 wt. %. Additional water and/or other optional additives may be employed as needed to bring the binder phase to 100 wt. %.

The binder serves to promote film formation and to bind the components of the composition together, especially in a coating prepared from the composition of the invention. Binders are well-known in the art. Examples of binders include aqueous resin systems such as synthetic latexes and mechanical dispersions, including acrylic-based latexes, styrene acrylic latexes, styrene/butadiene latexes, polyurethane dispersions, polyolefin dispersions, polyurethane-acrylic hybrid dispersions, and epoxy dispersions. Mixtures of binders may be employed. In one embodiment of the invention, a binder is incorporated into a gel as well as in the binder phase.

In one embodiment of the invention, the optional clay serves to protect the colorant when the gel is a weak gel. However, clay can also be employed with strong gels. A wide variety of clays suitable for use in coatings are well-known in the art. Examples of clays include aluminum magnesium silicates, and hydrous aluminum phyllosilicates, sometimes with variable amounts of cations of iron, lithium, magnesium, alkali metals, alkaline earths, and other cations. Mixtures of clays may be employed.

The peptizing agent serves to keep the clay from forming a gel in the binder phase. Examples of peptizing agents include sodium carbonate, sodium polyphosphate, sodium metaphosphate, sodium polyacrylate, sodium hydroxide, and pyrophosphates, such as potassium pyrophosphate and sodium pyrophosphate. Peptizing agents are well known to those skilled in the art, and many are commercially available. Mixtures of peptizing agents may be employed.

A defoamer may be employed to adjust the foaming properties of the composition to make it suitable for the desired end use. For example, a defoamer may be employed to reduce the foaming tendencies of a composition enough to make it more suitable for use as a coating or paint. Defoamers are well known to those skilled in the art, and many are commercially available. Examples of defoamers include, but are not limited to, silicone-based and mineral oil-based defoamers. Mixtures of defoamers may be employed.

The composition of the invention can be prepared, e.g., by a process comprising the following steps:
1) dispersing the colorant in water;
2) adding a hydrophilic polyurethane prepolymer into the colorant dispersion with stirring, and allowing a gel to form;
3) breaking up the gel by mechanical means;
4) adjusting the particle size of the gel to obtain gel granules of the desired average particle size; and
5) mixing the granules with a binder phase formulation or the components of such a formulation.

These steps can all be achieved using techniques well known to those skilled in the art. For example, in step 4 the gel from step 3 can be filtered using a sieve to get the desired gel granule size.

The dispersed colored gel in the binder phase may be made into a coating composition, e.g. an MCP, by formulation with one or more optional conventional coating additives, an exemplary but nonlimiting list of which is included hereinabove. These materials are well known in the art and many are commercially available. The formulation of coatings is discussed, e.g., in U.S. 2015/0059616.

A pigment is an inorganic material that is capable of materially contributing to the opacity, or hiding capability, of a composition, and especially of a coating prepared from such a composition. Suitable pigments advantageously have a refractive index of greater than 1.8. Examples of pigments include titanium dioxide ($TiO_2$), zinc oxide, zinc sulfide, barium sulfate, barium carbonate, and lithopone. $TiO_2$ is preferred. In various embodiments of the invention, the amount of pigment is from 0 to 50 wt. %, from 0 to 40 wt. % or from 5 to 25 wt. % of the weight of the binder phase.

A surfactant may be employed to adjust the properties of the MCP. Examples of surfactants include anionic, nonionic, cationic, and amphiphilic surfactants. Preferably, anionic and nonionic surfactants, and more preferably, nonionic surfactants are employed. Surfactants are well known to those skilled in the art, and many are commercially available. Mixtures of surfactants may be employed.

The dispersant may include nonionic, anionic and cationic dispersants such as polyacid with suitable molecular weight, 2-amino-2-methyl-1-propanol, dimethyl aminoethanol, potassium tripolyphosphate, trisodium polyphosphate, citric acid and other carboxylic acids. Preferred dispersants are the polyacids with suitable molecular weight range. The polyacids include homopolymers and copolymers based on polycarboxylic acids, including those that have been hydrophobically or hydrophilically modified, e.g., polyacrylic acid or polymethacrylic acid or maleic anhydride with various monomers such as styrene, acrylate or methacrylate esters, diisobutylene, and other hydrophobic or hydrophilic comonomers as well as the salts of the aforementioned dispersants, and mixtures thereof. The molecular weight of such polyacid is from 400 to 50,000, preferably from 400 to 30,000, more preferably from 500 to 10,000, even more preferably from 1,000 to 5,000, and most preferably from 1,500 to 3,000. More than one dispersant may be employed.

The MCP may include an optional biocide. The biocide may be organic or inorganic. Examples of biocides are described in U.S. Pat. No. 4,127,687 to DuPont, in U.S. Pat. No. 4,898,895 to Masuoka et al., and in WO1995/032862A1. Preferably, the biocide comprises at least one of chloromethylisothiazolinone, methylisothiazolinone, one with the active structure of diiodomethyl-p-tolylsulfone, or 4,5-dichloro-2-octyl-2H-isothiazol-3-one (DCOIT). Biocides are well known to those skilled in the art, and many are commercially available. Mixtures of biocides may be employed.

A rheology modifier may be employed to adjust the rheology of the composition to make it suitable for the desired end use. For example, a rheology modifier may be employed to thicken the composition enough to make it more suitable for use as a coating or paint.

Rheology modifiers are well known to those skilled in the art, and many are commercially available. Examples of rheology modifiers include polyvinyl alcohol, hydrophobically modified alkali soluble emulsions, alkali-soluble or alkali-swellable emulsions, hydrophobically modified ethylene oxide-urethane polymers, cellulosic thickeners, and the like. Mixtures of rheology modifiers may be employed.

The composition of the invention is useful for the preparation of coatings, such as interior wall decorative coatings. Advantageously, coatings prepared from the composition of the invention may be applied by spray or nonspray methods, including application by brush or trowel. Prior art celluloseand clay-based MCPs have poor shear resistance and can only be applied by spray gun. In addition, paints of the invention advantageously can be easily prepared using a simple process. Suitable substrates include, but are not limited to, concrete, cement board, MDF and particle board, gypsum board, wood, stone, metal, plastics, wallpaper and textile. Preferably, all the substrates are pre-primed by waterborne or solvent-borne primers.

The gel is a cross-linked gel, which shows good mechanical strength and stability. The stable gel structure advantageously may provide good colorant protection. The gel is robust and shows good shearing tolerance, and paint made from the gel may be applied by trowel. Because the gel has good compatibility with binders, such as latex binders, coatings prepared from the composition of the invention may contain a relatively high proportion of binder, which may include relatively hydrophobic binders, and therefore have a high potential to achieve good water resistance, even without a protective top coat.

Multicolor paints made using the composition of the invention can show special and surprising decorative appearances, and can have good shear resistance and good water resistance performance. These paints advantageously can be easily prepared using a simple process. Coatings prepared using the MCP can be tailored to have a variety of appearances based on factors such as the strength of the gel employed and the colors employed. Many of the following examples illustrate this point.

In one embodiment of the invention, the colored gel comprises water, from 0.05 to 10 wt. % colorant, and from 0 to 20 wt. % of a second cross-linker in reacted form, wherein the total weight of the gel is 100 wt. %, and wherein the prepolymer content of the gel is from 0.5 to 15%

Specific Embodiments of the Invention

All parts and percentages in the following experiments are by weight unless otherwise indicated.

TABLE 1

Raw Materials

| Function | Ingredients | Supplier |
|---|---|---|
| Gel or gelator | HYPOL ™ JT6005 brand prepolymer | The Dow Chemical Company |
| | PRIMAL ™ TX220 brand prepolymer | The Dow Chemical Company |
| Colorant | XERACOLOUR ™ red colorant | ICC International Chemical Corporation |
| | XERACOLOUR ™ black colorant | ICC International Chemical Corporation |
| | XERACOLOUR ™ purple colorant | ICC International Chemical Corporation |
| | XERACOLOUR ™ green colorant | ICC International Chemical Corporation |
| | XERACOLOUR ™ blue colorant | ICC International Chemical Corporation |
| | XERACOLOUR ™ yellow colorant | ICC International Chemical Corporation |
| Binder | PRIMAL ™ TX-310 acrylic emulsion | The Dow Chemical Company |
| | PRIMAL ™ AC261p acrylic emulsion | The Dow Chemical Company |
| | PRIMAL ™ SF155 styrene-acrylic emulsion | The Dow Chemical Company |
| | Impranil ® DL1380 polyurethane dispersion | Covestro AG |
| Rheology modifier | ACRYSOL ™ TT-935 | The Dow Chemical Company |
| Defoamer | NOPCO ® NXZ | Henkel |
| Second Cross-linker | Bayhydur ® XP2487/1 | Covestro AG |
| Clay | Laponite ® RD | BYK |
| Peptizing agent | Sodium pyrophosphate | SCRC |

Comparative Experiments A-C (Not An Embodiment of the Invention)

A colorant (0.5 wt. %) is dispersed in PRIMAL™ TX220 to get a colored hydrogel. The colored hydrogel is dispersed in PRIMAL™ TX310 brand binder to form a paint base. The desired particle size of the gel is obtained by shearing at 500 rpm for 2 min. This process is performed once with a red colorant (C.E. A) and once with a purple colorant (C.E. B). Both of the paint bases are then mixed with stirring with defoamer (0.5 wt. %) and rheology modifier (0.4 wt. %) to prepare an MCP (C.E. C). Further compositional details are given in Tables 2 and 3.

Examples 1-10 (Colored Hydrophilic Polyurethane Prepolymer Gels

1) A colorant (0.5 wt. %) is dispersed in water with stirring at 500 rpm for 5 min, then HYPOL™ JT6005 brand prepolymer is added and is dispersed by stirring at 1,000 rpm for 1 min. The resulting dispersion is left to form a gel.

2) Strong gels are broken-up by mechanical stirring at around 1,000 rpm and the broken-up gel is filtered by sieve to obtain colored gel granules of the desired particle size.

3) Weak gels are broken-up by mechanical stirring at around 200 rpm in an aqueous 5 wt. % clay dispersion.

4) Steps 1-3 are repeated for each color desired. Further compositional details are given in Table 2.

Figure 1:
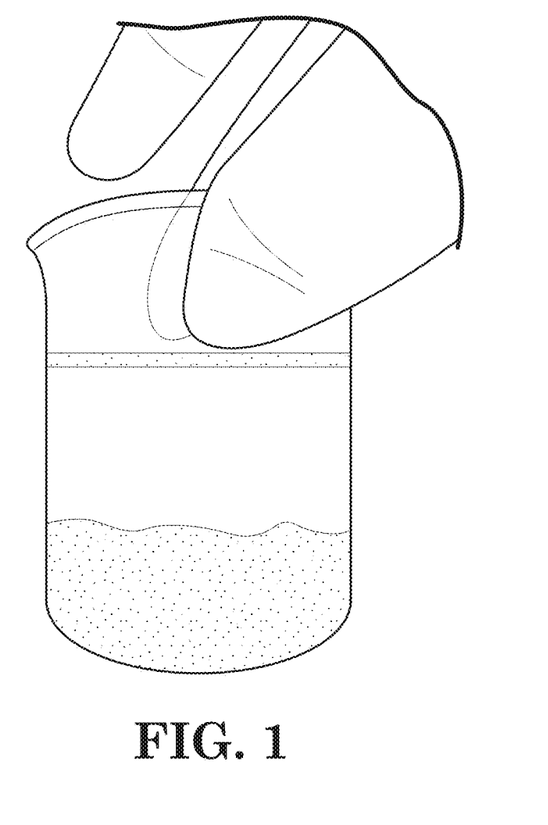
FIG. 1 shows the appearance of the colored strong hydrophilic polyurethane prepolymer mixture of gels of Ex.s 1 and 2 in water.

Gels of Ex. 1 and 2 are prepared having a gel size of 10-36 mesh. The colored gels are placed in water in a beaker, and vigorously sheared at 1,000 rpm for 5 min. The contents of the beaker are shown in FIG. 1. Visual observation shows that the water in the beaker is transparent, which indicates that no colorant is released from the gel.

Figure 2A:
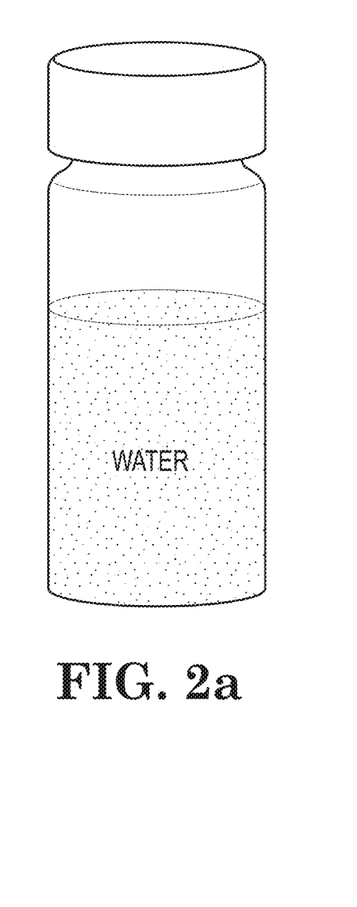
FIGS. 2a and 2b show a colored weak hydrophilic polyurethane prepolymer gel in water only (2a) and in a 5 wt. % clay dispersion (2b).
Figure 2B:
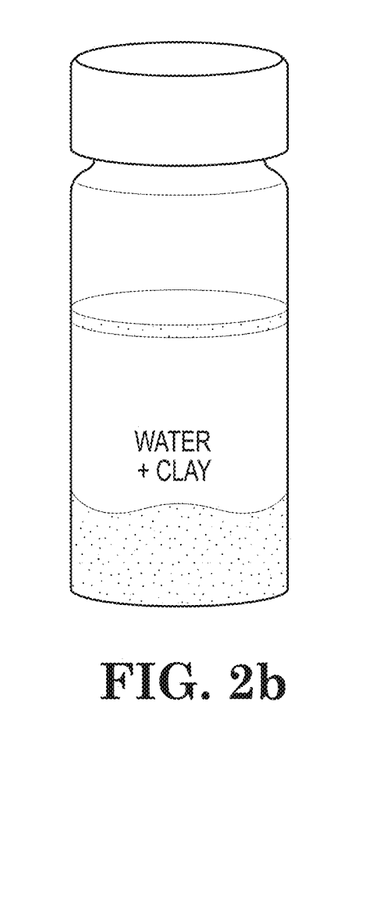

The weak gel of Ex. 5 is placed in water. Colorant is released from the gel, as determined by visual observation; see FIG. 2a. When the same gel is placed in a 5 wt. % clay aqueous dispersion, then the colorant is well protected; see FIG. 2b. This is confirmed by submitting a sample of the clear liquid to UV-VIS measurement, where no absorption peak is observed. The UV-VIS spectra is obtained by a scan from 800 nm to 300 nm using a UV-3600, available from Shimadazu, Japan. Thus, it is observed that the clay unexpectedly provides improved color protection for colored gel prepared using a low amount of the prepolymer.

TABLE 2

Basic formulation of colored hydrogels, in grams (g)

| | HYPOL ™ Gel | | | | Colorant | |
|---|---|---|---|---|---|---|
| | Natural Gel PRIMAL ™ TX220 | HYPOL ™ JT6005 | Water | Bayhydur ® XP2487/1 | Colorant 1 | Colorant 2 |
| C.E. A | 50 | | | | 0.25 g red colorant | |
| C.E. B | 50 | | | | | 0.25 g purple colorant |
| Ex. 1 | | 2.4 | 47.5 | | 0.25 g red colorant | |
| Ex. 2 | | 2.4 | 47.5 | | | 0.25 g purple colorant |

TABLE 2-continued

Basic formulation of colored hydrogels, in grams (g)

|  | Natural Gel PRIMAL™ TX220 | HYPOL™ Gel | | | Colorant | |
|---|---|---|---|---|---|---|
|  |  | HYPOL™ JT6005 | Water | Bayhydur® XP2487/1 | Colorant 1 | Colorant 2 |
| Ex. 3 |  | 2.4 | 47.5 |  | 0.5 g black colorant |  |
| Ex. 4 |  | 2.4 | 47.5 |  |  | 0.25 g black colorant |
| Ex. 5 |  | 1.3 | 48.7 |  | 0.25 g red colorant |  |
| Ex. 6 |  | 1.3 | 48.7 |  |  | 0.25 g green colorant |
| Ex. 7 |  | 1.3 | 48.7 | 1.2 | 0.25 g yellow colorant |  |
| Ex. 8 |  | 1.3 | 48.7 | 1.2 |  | 0.25 g green colorant |
| Ex. 9 |  | 1.3 | 48.7 | 2.5 | 0.25 g red colorant |  |
| Ex. 10 |  | 1.3 | 48.7 | 2.5 |  | 0.25 g blue colorant |

Examples 11-19 Colored Hydrophilic Polyurethane Prepolymer Gel-based Multi-color Paints Colored gel granules of different colors are poured into a binder phase to obtain a multicolor paint base. Defoamer & rheology modifier agents are added as in C.E. C to form a multicolor paint (Ex. 11, 12, 16, 17).

Colored weak gels of different colors are poured into a binder phase with clay and stirred at around 200 rpm to get a desired gel size and to obtain a multicolor paint base. Defoamer and rheology modifier are added as in C.E. C to form a multicolor paint. (Ex. 13-15, 18, 19).

Further compositional details are given in Table 3.

TABLE 3

Basic formulation of MCPs, in grams (g)

|  | Gel | | Binder | | | | | | |
|---|---|---|---|---|---|---|---|---|---|
|  | Gel 1 | Gel 2 | PRIMAL™ TX310 | PRIMAL™ AC261p | PRIMAL™ SF155 | Impranil® DL1380 | Laponite® RD | Sodium pyrophosphate | Water |
| C.E.C | 25 g C.E. A | 25 g C.E. B | 100 |  |  |  |  |  |  |
| Ex. 11 | 25 g Ex. 1 | 25 g Ex. 2 |  | 100 |  |  |  |  |  |
| Ex. 12 | 25 g Ex. 3 | 25 g Ex. 4 |  | 100 |  |  |  |  |  |
| Ex. 13 | 25 g Ex. 5 | 25 g Ex. 6 |  | 9 |  |  | 4.5 | 0.5 | 86 |
| Ex. 14 | 25 g Ex. 7 | 25 g Ex. 8 |  | 9 |  |  | 4.5 | 0.5 | 86 |
| Ex. 15 | 25 g Ex. 9 | 25 g Ex. 10 |  | 9 |  |  | 4.5 | 0.5 | 86 |
| Ex. 16 | 25 g Ex. 1 | 25 g Ex. 2 |  |  | 100 |  |  |  |  |
| Ex. 17 | 25 g Ex. 1 | 25 g Ex. 2 |  |  |  | 100 |  |  |  |
| Ex. 18 | 25 g Ex. 7 | 25 g Ex. 8 |  |  | 9 |  | 4.5 | 0.5 | 86 |
| Ex. 19 | 25 g Ex. 7 | 25 g Ex. 8 |  |  |  | 9 | 4.5 | 0.5 | 86 |

The paints of C.E. C and Ex.s 11-15 are cast on a cement board substrate and dried. The appearance of each multicolor paint is shown in FIGS. 3a through e, respectively. Compared to the appearance of the traditional multicolor paint shown in FIG. 3a, some of the coatings prepared using the compositions of the invention exhibit unexpected patterns, such as silky, silky-flaky, and flaky patterns as shown in FIGS. 3d, 3e and 3f, respectively.

For the purposes of the invention, the term "granular" in appearance with respect to an MCP means that a dried paint that has been applied to a substrate exhibits a pattern in which the coating or dried paint displays more angular color domains and has a more three-dimensional appearance and feel. For example, FIGS. 3b and 3c display a granular coating.

For the purposes of the invention, the term "silky" in appearance with respect to an MCP means that a dried paint that has been applied to a substrate exhibits a thread-like pattern in which the individual colored areas have a relatively large aspect ratio, i.e. ratio of length to width. For example, FIG. 3d displays a silky coating.

For the purposes of the invention, the term "flaky" in appearance with respect to an MCP means that a dried paint that has been applied to a substrate exhibits a plate-like pattern. For example, FIG. 3f displays a flaky coating.

For the purposes of the invention, the term "silky-flaky" in appearance with respect to an MCP means that a dried paint that has been applied to a substrate exhibits a combination of silky and flaky patterns. For example, FIG. 3e displays a silky-flaky coating.

Figure 3A:
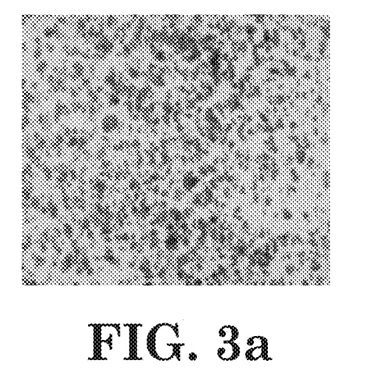
FIGS. 3a through 3f show the appearance of coatings prepared using the multi-color paints of: a) C.E. C, b) Ex 11, c) Ex. 12, d) Ex. 13 with a silky pattern, e) Ex. 14 with a silky-flaky pattern, and f) Ex. 15 with a flaky pattern.
Figure 3B:
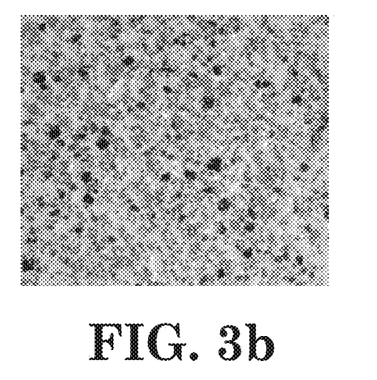
Figure 3C:
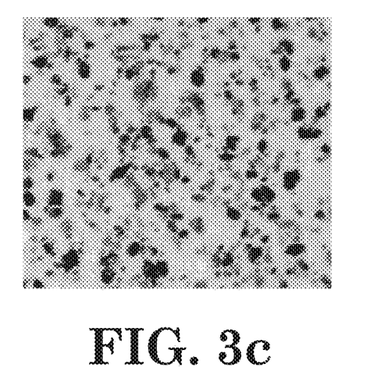
Figure 3D:
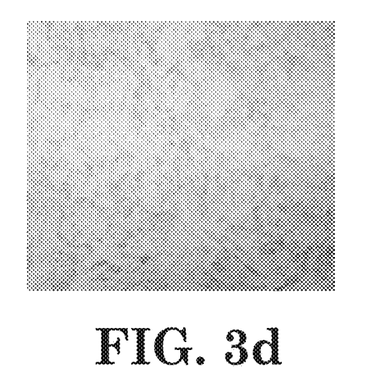
Figure 3E:
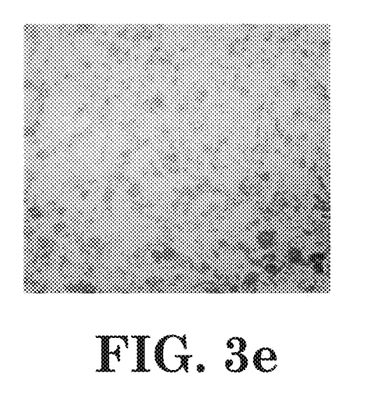
Figure 3F:
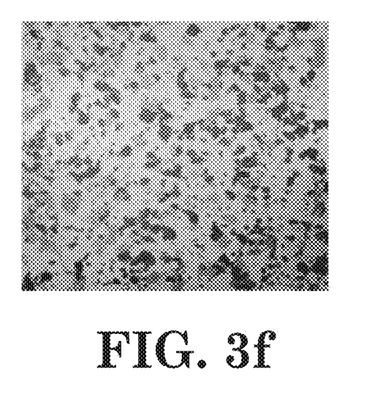

When the prepolymer content of a gel is high, i.e. from 3 to 15 wt. % prepolymer, a granular coating pattern can be obtained, as shown in FIGS. 3b and 3c, and when the prepolymer content of a gel is low, i.e. from 0.5 to less than 3 wt. %, silky and/or flaky patterns can be obtained with the assistance of clay and optional cross-linking chemistry. Different patterns can be easily achieved by adjusting the concentration of prepolymer, second cross-linker, etc., and shearing speed, which thus give a wide window of operation to commercial production methods.

The coatings prepared using the compositions of Examples 13, 14 and 15 are smooth after drying, which shows that the compositions are useful for the preparation of interior wall decorative coatings.

Coatings with silky, silky-flaky and flaky patterns can be obtained by tuning or adjusting the texture of the gel used to prepare multicolor paints. These patterns are rarely seen in the current market.

Figure 4A:
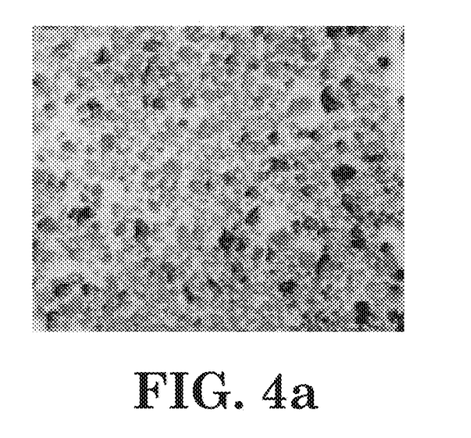
FIGS. 4a through 4c show coatings prepared using colored strong hydrophilic polyurethane prepolymer gels and various binders.
Figure 4B:
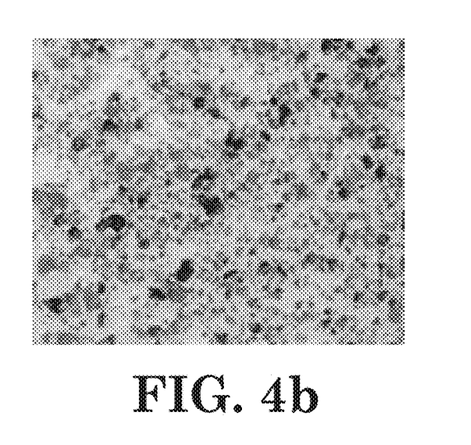
Figure 4C:
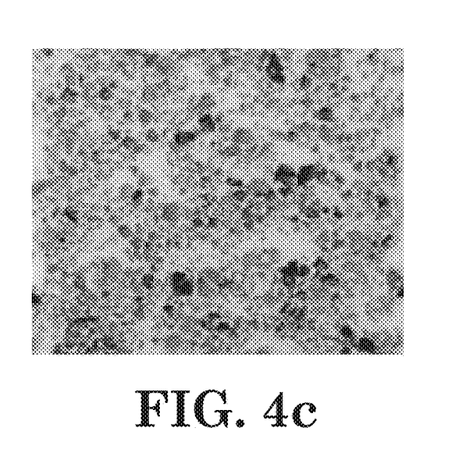

The MCPs of Examples 11, 16 and 17 are used to evaluate the compatibility of colored strong gels with the binders PRIMAL™ AC261p (pure acrylic emulsion), PRIMAL™ SF155 (styrene-acrylic emulsion) and Impranil® DL1380 (polyurethane dispersion). The appearance of paints prepared using each binder/gel combination are shown in FIGS. 4a through 4c, which show the coatings of Examples 11, 16 and 17, respectively. It can be seen that in these formulations colored gels of the invention are provided good colorant and shape protection no matter which binder is used, and that good multicolor coatings are prepared.

Figure 5A:
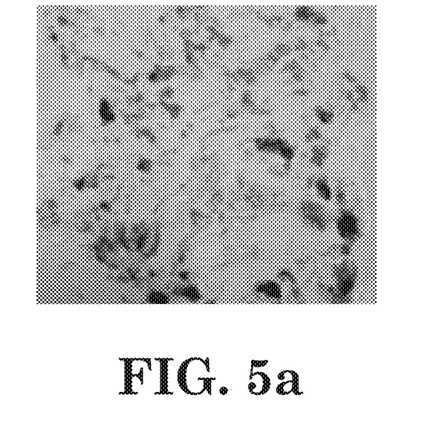
FIG. 5a through 5c show the compatibility between colored weak hydrophilic polyurethane prepolymer gels with binders.
Figure 5B:
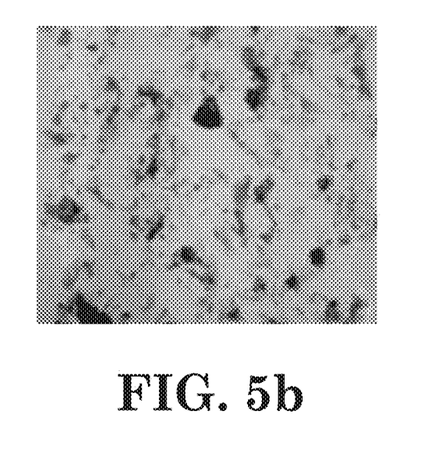
Figure 5C:
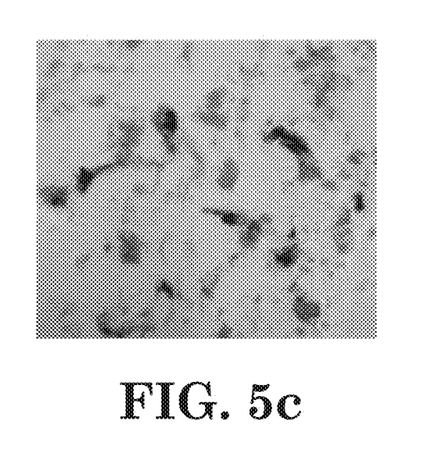

The MCPs of Ex.s 14, 18 and 19 are coated to evaluate the effect of clay on colorant protection. As shown above, when a gel is prepared using less than 3 wt. % HYPOL™ JT6005 brand prepolymer, resulting in a weak or low strength gel, then clay can be employed to help protect the colorant. The binders used with a weak gel advantageously are compatible with the clay employed. In these examples, PRIMAL™ AC261p brand pure acrylic binder, PRIMAL™ SF155 brand styrene-acrylic binder and Impranil® DL1380 brand polyurethane dispersion are used to study their compatibilities with clay. No gel formation is observed during the mixing of clay and binders, which indicates compatibility between them. The composite/binder formulations are shown in Table 3. Sodium pyrophosphate is used as a peptizing agent in the formulations to help disperse the clay and inhibit clay network formation during standing. The appearances of coatings prepared from the resulting formulations are shown in FIG. 5a-c, corresponding to Ex.s 14, 18 and 19, respectively. It can be seen that the colorants are well protected in these three binder systems.

Water Resistance

The water resistance of an MCP is evaluated. One advantage of the composition of the invention is that binder polymers with relatively high solid contents can be employed when a strong gel is employed. This may significantly improve the water-resistance of a coating produced using a composition of the invention.

An MCP is prepared using the procedure of Ex. 11. The binder is PRIMALυ AC261p, which has a solids content of 50 wt. %. The MCP is applied on a black substrate. When dry, the coating is immersed in water to evaluate water resistance. If a coating turns white, it means that water is swelling the coating and the coating is losing its water resistance.

The coating shows good water resistance. The color domains of the coating start to become whiter after 3 hours. The coating is held immersed in water for a longer time evaluation, and it is observed that the coating still maintains its adhesive performance and strength even after 2 months.

Application Methods (C.E. C, Ex. 11)

Figure 6A:
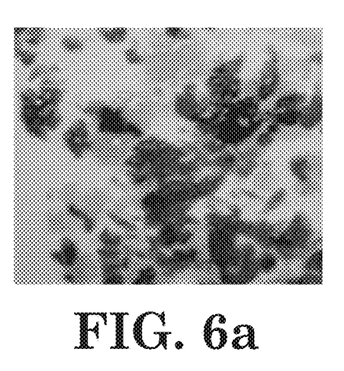
FIGS. 6a and 6b show a coating of the paint of C.E. C applied by spray gun before and after treatment with a trowel, respectively.
Figure 6B:
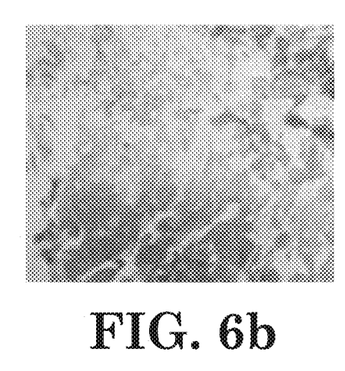
Figure 6C:
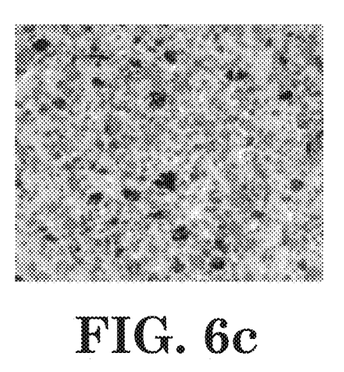
FIGS. 6c and 6d show a coating of the paint of Ex. 11 applied by spray gun before and after treatment with a trowel, respectively.
Figure 6D:
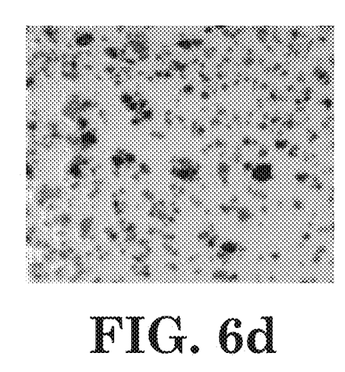

A trowel is a commonly used tool for applying interior wall paint. The MCPs of C.E. C and Ex. 11 are compared to see the effect of using a trowel tool on a wet paint that is applied by spray gun, and the results are shown in FIG. 6. FIGS. 6a and 6b show a coating of the paint of C.E. C applied by spray gun before and after treatment with a trowel, respectively. FIGS. 6c and 6d show a coating of the paint of Ex. 11 applied by spray gun before and after treatment with a trowel, respectively.

It is clear that the MCP of C.E. C has poorer shear resistance compared to the MCP of Example 11, as the gel domains of C.E. C deform under the trowel while the gel in the MCP of the example tends to keep its original shape even after trowel treatment.

The invention claimed is:

1. A composition comprising a cellulose-free colored hydrophilic polyurethane prepolymer gel including from 0.05 to 10 wt. % colorant, and wherein the gel is the reaction product of water with a hydrophilic polyurethane prepolymer having a free NCO content of from 1 to 5 wt. %.

2. The composition of claim 1 wherein the hydrophilic polyurethane prepolymer has a free NCO content of from 1.5 to 3 wt. %, based on the weight of the prepolymer.

3. The composition of claim 1 wherein the prepolymer content of the gel is from 0.1 to 15 wt. % based on the weight of the gel.

4. The composition of claim 1 further comprising a binder phase.

5. The composition of claim 4 wherein the weight ratio of the gel to the binder phase is from 1:20 to 10:1.

6. The composition of claim 1 wherein the prepolymer content of the gel is from 3 wt. % to 15 wt. %, based on the weight of the gel, and wherein the composition is free of clay.

7. The composition of claim 1 wherein the prepolymer content of the gel is from 0.5 to less than 3 wt. %, and wherein the binder phase comprises from 1 to 70 wt. % binder, from 0.1 to 10 wt. % clay, from 0.01 to 1 wt. % peptizing agent, from 0 to 3 wt. % defoamer and from 0 to 3 wt. % rheology modifier.

8. The composition of claim 1 wherein the colored gel comprises water and from 0 to 20 wt. % of a second cross-linker in reacted form, wherein the total weight of the gel is 100 wt. %, and wherein the prepolymer content of the gel is from 0.5 to 15%.

9. The composition of claim 1 comprising a cellulose-free colored hydrophilic polyurethane prepolymer gel and a binder phase, wherein the gel is prepared from the reaction, in the presence of a colorant, of water and a prepolymer having a free NCO content of from 1 to 5 wt. %, based on the weight of the prepolymer, and wherein zero or more of the following optional components may be included: a clay, a peptizing agent, an extender, a dispersant, a biocide, a defoamer and/or a rheology modifier.

10. A multicolor paint prepared using the composition of claim 1 by admixing the cellulose-free colored hydrophilic polyurethane prepolymer gel of claim 1 with a binder.

* * * * *